(12) United States Patent
Schiele et al.

(10) Patent No.: US 7,958,983 B2
(45) Date of Patent: Jun. 14, 2011

(54) HYDRAULIC SYSTEM IN MOTOR VEHICLES

(75) Inventors: Peter Schiele, Kressbronn (DE);
Christian Popp, Kressbronn (DE);
Thilo Schmidt, Meckenbeuren (DE)

(73) Assignee: ZF Friedrichshafen AG,
Friedrichshafen (DE)

( * ) Notice: Subject to any disclaimer, the term of this patent is extended or adjusted under 35 U.S.C. 154(b) by 604 days.

(21) Appl. No.: 12/093,464

(22) PCT Filed: Nov. 16, 2006

(86) PCT No.: PCT/EP2006/010981
§ 371 (c)(1),
(2), (4) Date: May 13, 2008

(87) PCT Pub. No.: WO2007/068319
PCT Pub. Date: Jun. 21, 2007

(65) Prior Publication Data
US 2008/0296124 A1 Dec. 4, 2008

(30) Foreign Application Priority Data
Dec. 13, 2005 (DE) .................. 10 2005 059 356

(51) Int. Cl.
*F16D 48/06* (2006.01)
*F16D 25/12* (2006.01)
*F16D 13/74* (2006.01)

(52) U.S. Cl. ............ 192/85.61; 192/70.12; 192/85.63; 192/113.35

(58) Field of Classification Search ............ 192/85.63, 192/113.35, 85.61
See application file for complete search history.

(56) References Cited

U.S. PATENT DOCUMENTS

| 4,531,485 | A | | 7/1985 | Murther |
| 5,474,428 | A | | 12/1995 | Kimura et al. |
| 5,845,756 | A | * | 12/1998 | Dairokuno et al. ........ 192/85.61 |
| 6,390,947 | B1 | | 5/2002 | Aoki et al. |
| 6,692,402 | B2 | | 2/2004 | Nakamori et al. |
| 6,695,748 | B2 | | 2/2004 | Kopec et al. |
| 6,848,555 | B2 | * | 2/2005 | Sakata et al. ............... 192/70.12 |
| 7,077,256 | B2 | | 7/2006 | Gratzer et al. |
| 7,296,669 | B2 | | 11/2007 | Quehenberger et al. |
| 2004/0159523 | A1 | * | 8/2004 | Duan et al. ............... 192/113.34 |

FOREIGN PATENT DOCUMENTS

| DE | 43 42 233 A1 | 6/1994 |
| DE | 101 43 929 A1 | 3/2002 |
| DE | 101 28 856 A1 | 5/2002 |
| DE | 101 62 973 A1 | 8/2002 |
| EP | 0 348 270 A1 | 12/1989 |
| EP | 1 223 365 A2 | 7/2002 |
| EP | 1 236 918 A1 | 9/2002 |
| EP | 1 371 868 A1 | 12/2003 |
| WO | WO-00/55527 | 9/2000 |
| WO | WO-02/079661 A1 | 10/2002 |
| WO | WO-2004/040158 A2 | 5/2004 |

\* cited by examiner

*Primary Examiner* — Richard M. Lorence
(74) *Attorney, Agent, or Firm* — Davis & Bujold, P.L.L.C.

(57) ABSTRACT

A hydraulic system in motor vehicles with at least one hydraulically actuated clutch, which entails minimized control complexity for supplying the clutch with hydraulic oil and which takes up less structural space. These characteristics are achieved essentially in that the pressure control of the hydraulically actuated clutch is effected directly and exclusively by an electrically driven and electronically controlled oil pump.

20 Claims, 2 Drawing Sheets

HYDRAULIC SYSTEM IN MOTOR VEHICLES

This application is a national stage completion of PCT/EP2006/010981 filed Nov. 16, 2006, which claims priority from German Application Serial No. 10 2005 059 356.9 filed Dec. 13, 2005.

FIELD OF THE INVENTION

The invention concerns a hydraulic system in motor vehicles with at least one hydraulically actuated clutch, which is activated by an oil pressure supplied by an oil pump.

BACKGROUND OF THE INVENTION

From DE 43 42 233 A1 an oil pump drive device is known, which is combined with a transmission coupled to a drive machine in order to deliver working oil to the transmission for lubrication and to enable shift processes in the transmission. In this, the transmission comprises a first force transfer path to connect the output shaft of an electric motor to the drive input shaft of the oil pump, and a second force transfer path to connect the output shaft of the drive machine to the drive input shaft of the oil pump. A control device selects the first force transfer path to drive the oil pump by way of the electric motor when the speed of the drive machine's output shaft is below a predetermined speed, and selects the second force transfer path when the speed of the drive machine exceeds the predetermined speed.

Further, from DE 101 43 929 A1, an electro-hydraulic transmission control device for generating and emitting hydraulic pressure input signals to the clutches, brakes and shift mechanisms of an automatic transmission is known, such that a module body accommodates and carries the components of the transmission control device and generates flow messages. Several control valves are fixed on the module body and control hydraulic fluid in the lines. In addition, several magnetic control valves are arranged on the module body. A regulator is also connected to the electromagnets of the magnetic control valves and controls them by actuating the electromagnets as a function of input signals supplied by sensors for detecting various parameters of the operating status of the vehicle. A mechanically or electrically driven oil pump, integrated in the transmission control device, delivers the pressurized oil to the control valves.

Furthermore, DE 101 62 973 A1 proposes an automatic transmission with a main oil pump driven by a combustion engine, an auxiliary oil pump driven by an electric motor and with a drive control device for the auxiliary oil pump driven by the electric motor, such that the operating voltage supplied to the latter is adapted on the basis of the measured oil temperature corresponding to the operating status of the automatic transmission in each case. In essence, the intention is to maintain the hydraulic pressure required and, in addition, to prevent a hydraulic pressure greater than required from being delivered. Regardless of this, here too a hydraulic control device is provided which, for its part, entails greater expenditure.

To keep the expenditure for an electric auxiliary oil pump low, in EP 1 223 365 A2, it is proposed in certain operating situations to maintain the necessary clutch pressure, a mechanical and an electric motor driven oil pump are operated together and then, when the measured clutch pressure reaches a value that the mechanical main oil pump can deliver on its own, the electric auxiliary oil pump is immediately switched off. Accordingly, the auxiliary oil pump is controlled in such a way that a necessary and measured system pressure and clutch pressure is maintained in the transmission.

From U.S. Pat. No. 6,390,947 B1, a hydraulic circuit is known for controlling the oil pressure delivered to an automatic transmission of a vehicle with a mechanical oil pump driven by the drive engine and with an automatic engine start/stop system. In the hydraulic circuit a bypass line is arranged with an electrically driven oil pump. The mechanically and electrically driven oil pumps are connected in parallel. This measure is designed to adapt the oil pressure in the system to the current operating conditions.

Finally from U.S. Pat. No. 4,531,485 B, a switching logic system is known for a mechanically driven oil pump and an electrically driven auxiliary oil pump associated with a combustion engine.

In summary and supplementarily, it can be said that hydraulically actuated clutches are controlled by clutch valves, electric pressure regulators, timed magnetic valves, actuators and/or other components. The pressure is supplied predominantly by a mechanical oil pump driven by the drive mechanism of the main drive (internal combustion engine) of a vehicle. Further, electric oil pumps are also known, which supplement the mechanical oil pump in drive technological terms (auxiliary oil pumps).

Conventionally, downstream from such electric oil pumps is connected a hydraulic control unit that consists of at least one hydraulically actuated valve (clutch valve) and an electric actuator, such as an electronic pressure control valve or a hydraulic actuator. In addition, such hydraulic control units often comprise a system-pressure control system as well, which limits the hydraulic power output of the oil pump (in most cases an oversupply to ensure that the maximum demand is covered) in that too much oil is delivered into the intake line of the oil pump or to the oil sump.

For example, if individually controlled clutches are arranged in structural groups of a vehicle, for example in a transfer gearbox which can also be combined with manual shift transmissions and can then not make use of a pressure supply from an automatic transmission, the cost and complexity entailed by the oil pumps, system controls, clutch valves and electric actuators for the pressure actuation of the clutches are considerable. The fewer clutches there are in such a structural group, the greater are the costs for this complexity, in relation to the clutch to be actuated.

It should also be pointed out that although in the prior art the cooling of known wet-operating clutches is often designed to be controllable as a function of need, this entails additional control cost and complexity and also influences the size of the oil pumps. To that extent, the efficiency of the oil pumps is reduced because the delivery volume demand for the wet clutch is too large.

Against this background, the purpose of the present invention is to provide a hydraulic system in motor vehicles with at least one hydraulically actuated clutch and an oil pump which, as a further improvement of known generic devices, entails minimized control cost and complexity in terms of components and software for supplying the clutch with hydraulic oil and, if necessary, cooling oil and which also requires less structural space for the controls concerned.

SUMMARY OF THE INVENTION

The objective set is achieved by a hydraulic system in a motor vehicle, having at least one hydraulically actuated clutch, for the actuation of which an oil pressure is supplied by an oil pump and in which oil pressure control of the clutch takes place directly and exclusively by way of an oil pump which can be driven electrically and controlled by electronic means. In this way, at least most of the additional control valves used in the prior art can advantageously be omitted.

According to a first embodiment of the invention, to regulate the oil pressure, the electrically driven and electronically controlled oil pump is associated with an oil pressure sensor that provides measurement values to an electronic pump control unit which, for its part, generates control signals for controlling the electric motor of the oil pump as a function of clutch pressure and/or clutch torque specifications.

According to a second embodiment of the invention to regulate the oil pressure, the electrically driven and electronically controlled oil pump can be associated with at least one pump current sensor, i.e., a sensor for determining the electric current for the oil pump, or a pump torque sensor or a pump speed sensor. The measurement values obtained are made available to the pump control unit which, for its part, generates control signals for controlling the electric motor of the oil pump as a function of predetermined clutch pressure and/or clutch torque specifications.

For the determination of the control signals, the measured current temperature and/or viscosity of the hydraulic oil can also be taken into consideration.

Moreover, the pump control unit can either be made as a separate control unit or implemented in other control devices of the drive train of the motor vehicle known in themselves, such as a transmission control system, an engine control system or the like.

If the clutch in question is a wet-operating clutch, the oil pump can also be used to supply cooling oil to it and, in that case, to ensure long-term operation of the oil pump and a dynamic response thereof to varying pressure specifications, a bypass with a bypass valve or bypass throttle is provided in the hydraulic oil or the cooling oil circuit. The bypass formed can be made in such manner that the "internal leakage" of the oil pump is fed back to its intake side and/or to the clutch, at least as a basic supply for cooling.

When the clutch concerned is the wet-operating clutch, to cover the eventuality of a somewhat elevated cooling oil volume flow in it a mechanically driven second oil pump can be associated therewith. The mechanically driven second oil pump can be in active connection with the wet-operating clutch in such manner that with the aid of suitable drive means, the oil pump can be actuated by a speed difference between the primary side and the secondary side of the clutch.

On the other hand, it can also be that the mechanically driven oil pump is actively connected with the wet-operating clutch, via an upstream drive output gear, in such a manner that in every case a minimum pump speed that delivers the oil is maintained.

Likewise, the mechanically driven second oil pump can be driven by any component rotating at an appropriate speed in the driving direction, while the pump is supported on a non-rotating component. The component rotation speed can be derived from any rotating component of the motor vehicle's drive train and the non-rotating component can be a housing element such as a transmission housing or the like.

The above-mentioned particular design embodiments of the mechanical drive of the second oil pump provide a cooling oil supply according to need without complex control measures. In addition, the provisions also improve efficiency substantially since the drag torques of the clutch and the reactive power of the pump are reduced.

As the invention also provides, to enable the cooling to be switched on at least one hydraulically actuated switching valve or an electrically operated actuator such as a magnetic valve or the like is associated with the suction side or the pressure side of the mechanically driven second oil pump. The at least one hydraulically actuated switching valve can be actuated, as necessary, by virtue of the control pressure of the electrically driven and electronically controlled oil pump specified by the electronic pump control unit.

With regard to the at least one electrically operated actuator, this can be activated or de-activated, as necessary, by the electronic pump control unit or any other suitable control unit.

Further, it is proposed that both when the clutch is actively actuated and also when the wet-operating clutch has to be operated in a partially disengaged condition with a speed difference when, having regard to the desired low drag torques already mentioned above, it is desirable to have only slight cooling. The cooling is switched on by opening the at least one hydraulically actuated switching valve or electrically activated actuator and is otherwise interrupted.

Furthermore, it is regarded as expedient for a buffer reservoir, designed to temporarily hold any surplus cooling oil that results from elevated delivery amounts during short speed surges of the mechanically driven second oil pump, to be associated with the wet-operated clutch. The stored oil surplus can then be used for after-cooling once the speed surge and accordingly the volume flow maximum have ended.

Finally, it can be provided that the cooling oil supply to the wet-operated clutch can take place radially from the inside outward or in the reverse direction.

BRIEF DESCRIPTION OF THE DRAWINGS

The invention will now be described, by way of example, with reference to the accompanying drawings in which.

DETAILED DESCRIPTION OF THE INVENTION

Figure 1:
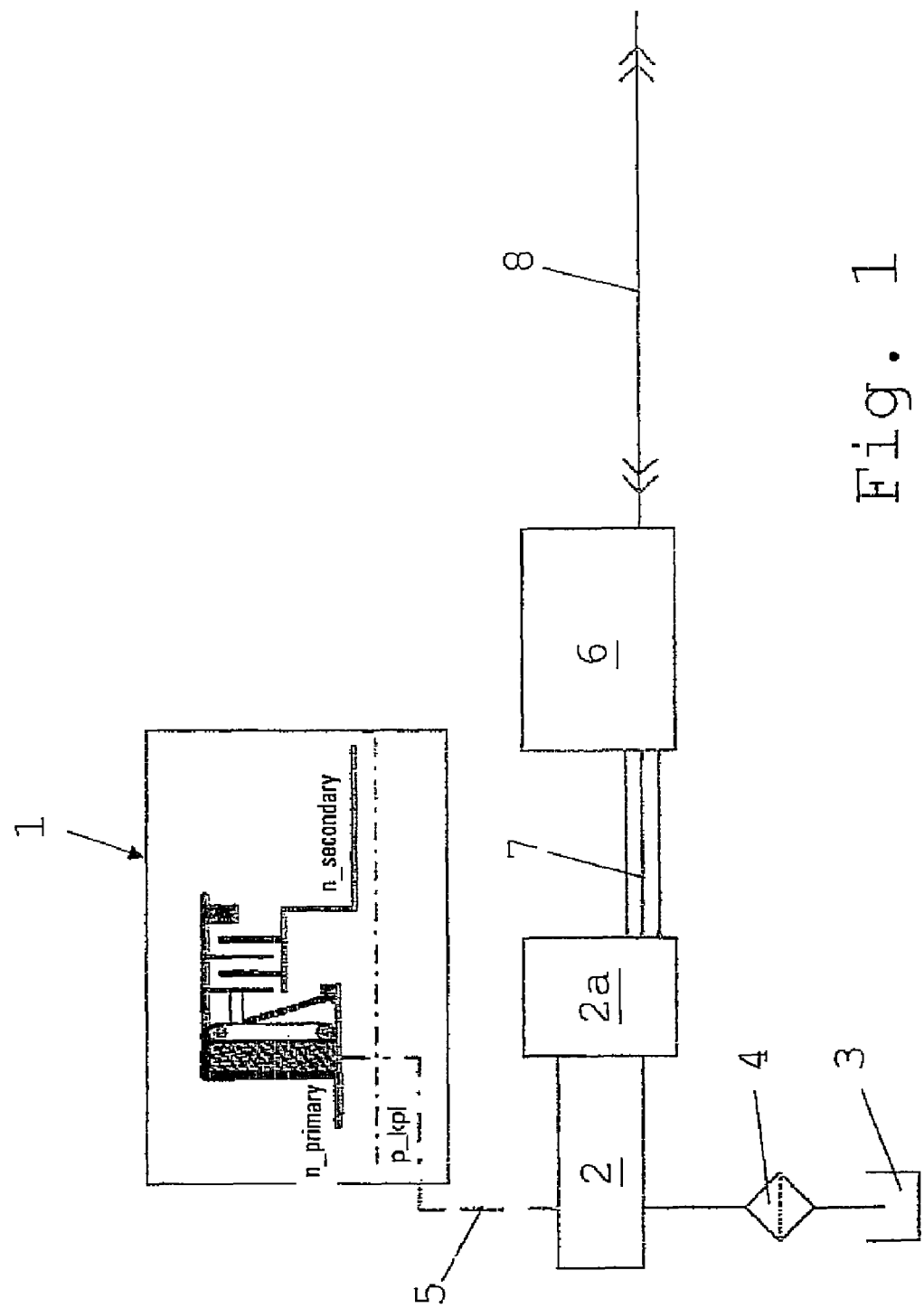
FIG. 1 is a schematic illustration of the principle of the pressure control system of a hydraulically actuated clutch.

FIG. 1 is a schematic illustration showing a hydraulically actuated clutch 1, in this case a lamellar or disk clutch of a transmission known in itself (not shown in greater detail), for example a transfer gearbox of a motor vehicle.

As already explained earlier, the pressure control of the clutch 1 is, in this case, effected directly and exclusively by way of an electrically driven and electronically controlled oil pump 2. The necessary hydraulic oil is drawn from a tank or oil sump 3 and delivered to the clutch 1 as a clutch actuation pressure $p\_kpl$, via a suction filter 4, by the electrically driven oil pump 2 through a pressure line 5.

The oil pump 2 is associated with an electronic pump control unit 6 which, as a function of clutch pressure specifications and/or clutch torque specifications provided and after evaluating measurement values supplied continuously by an oil pressure sensor (not shown in more detail), generates control signals for controlling an electric motor 2a of the oil pump 2 or to regulate a control current 7 thereof. Accordingly, the oil pump 2 and the pump control unit 6 are expediently connected to an on-board electrical network 8 of the motor vehicle.

Alternatively to the oil pressure sensor, a pump flow detection sensor, a pump torque sensor or a pump speed sensor can also be used, whose measurement values are sent to the pump control unit 6 for evaluation (not illustrated further). If, as an alternative to the pressure sensor, the pump pressure currently applied is not measured but calculated, then the calculation algorithm can be refined by determining the temperature of the hydraulic oil and taking its viscosity into consideration.

In the present case, the pump control unit 6 is made as a separate control unit. It is certainly also possible and accordingly covered by the scope of the present invention, to implement it in other control devices of the motor vehicle's drive train, known in themselves (not illustrated in more detail here), such as a transmission control device, an engine control device or the like, or to arrange it as an on-the-spot electronic unit directly in the area of the pump or even to integrate it in a hydraulic control system supplied with pressure by the pump.

If the clutch 1 is a wet-operating clutch 1, the oil pump 2 can be associated with a bypass in the hydraulic circuit comprising a bypass valve or a bypass throttle (not shown). This meets the requirement for long-term operation of the oil pump 2 without providing an essential working pressure for clutch actuation, whereby a dynamic response of the oil pump 2 to varying pressure conditions is achieved when the oil pump 2 is already operating and does not first have to be started as necessary from rest. The "internal leakage" of the oil pump 2 then produced can expediently be injected back into the suction side thereof in order to maintain or increase the efficiency of the oil pump 2.

In the case of a wet-operating clutch 1, the "internal leakage" can in addition be used as a basic supply for cooling the clutch 1. Furthermore, this "leakage" can be designed to be sufficient for cooling the clutch 1, this being particularly appropriate for clutches 1, which are not so highly loaded so that there is no need for a costly clutch cooling system with the corresponding structural complexity.

In contrast, if the clutch is a highly loaded wet-operating clutch 1, such as a wet-operating clutch 1 of a transfer gearbox 9, then to cover a rather higher cooling volume flow thereof, a mechanically driven, second oil pump 10 is provided.

Figure 2:
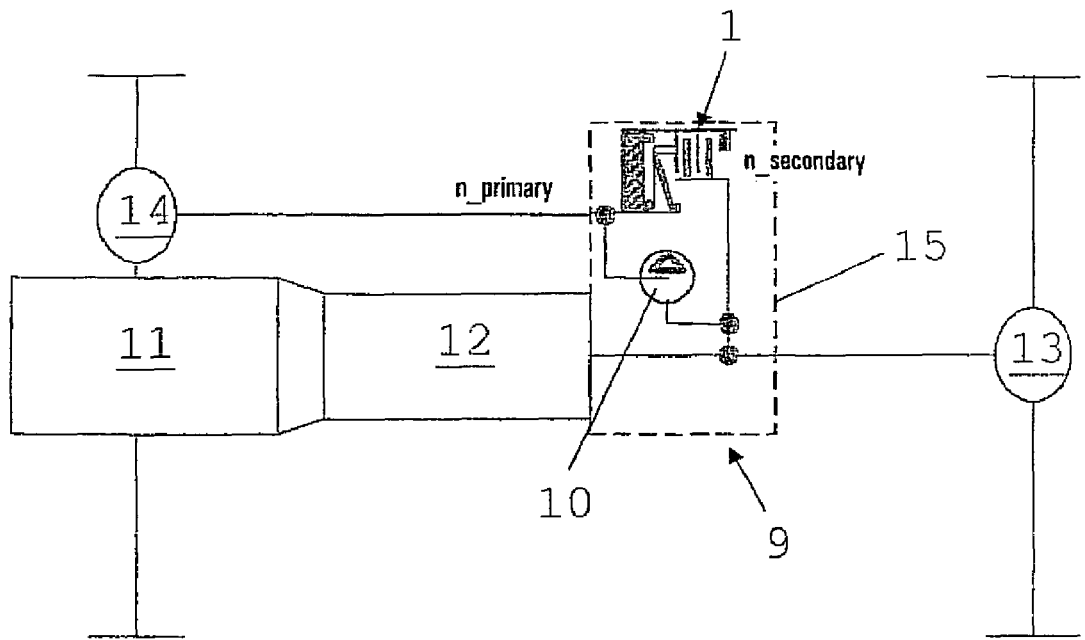
FIG. 2 is a schematic illustration of a principle relating to the arrangement of a mechanically driven oil pump for cooling a hydraulically operated, wet clutch, considering the sample of a transfer gearbox, according to a first embodiment.

FIG. 2 schematically shows a drive train of a motor vehicle that comprises the distributor gearbox 9, with a drive engine 11, a transmission 12, a rear axle 13 and a front axle 14, on which in each case there are differential transmissions. The differential transmissions of the two vehicle axles 13 and 14 are driven by drive shafts (not shown in more detail) which are drivingly connected with the output shaft of the transmission 12 by way of the transfer gearbox 9. The differential transmission of the front axle 14 can be actively connected with the transfer gearbox 9 by the wet-operating clutch 1 and can, in that way, be driven by a drive torque, as necessary.

In the present case, the second oil pump 10 can be mechanically actively connected with the clutch 1 in such a manner that the oil pump 10 is speed-controlled as a function of the clutch speed differences n_secondary−n_primary or n_primary−n_secondary between the primary side and the secondary side of the clutch 1, whereby a slip-controlled oil delivery by the oil pump 10 can also be used to provide a supply of cooling oil to the clutch 1 in a simple way and as necessary. In the example illustrated in FIG. 2, the housing of the oil pump 10 is connected to the secondary side and the delivery means of the oil pump 10 to the primary side of the wet-operating clutch 1, to the latter of which the drive shaft leading to the front axle 14, is also connected so that the oil pump 10 draws oil from a tank or oil sump and can also supply components other than the clutch 1 with cooling oil, as needed.

If there is no speed difference between the primary and secondary sides of the clutch 1, then as is known, only a small amount of cooling oil is sufficient for the after-cooling or constant cooling thereof and can be dealt with by the above-mentioned "internal leakage" of the electrically driven and electronically controlled oil pump 2.

Only when there is a speed difference between the primary and secondary sides of the clutch 1 is there a steep rise in the demand for cooling oil as clutch torque increases, which is then provided for by the forced coupling of delivery power from the mechanically driven, second oil pump 10.

For those with knowledge of the subject, it is easy to deduce from an understanding of the invention that the mechanically driven, second oil pump 10 can also be connected with the wet-operating clutch 1 by additional drive gearing upstream from the latter (not shown), in such a manner that in any case, i.e., even if there is no or only a very small speed difference between the primary and secondary sides of the clutch 1, a pump speed is maintained which produces a certain minimum oil delivery to cover the basic cooling oil demand.

Likewise, the mechanically driven oil pump 10 can also be driven by any rotating component in the drive train and can itself be supported on a non-rotating component 15, such as a transmission housing.

Figure 3:
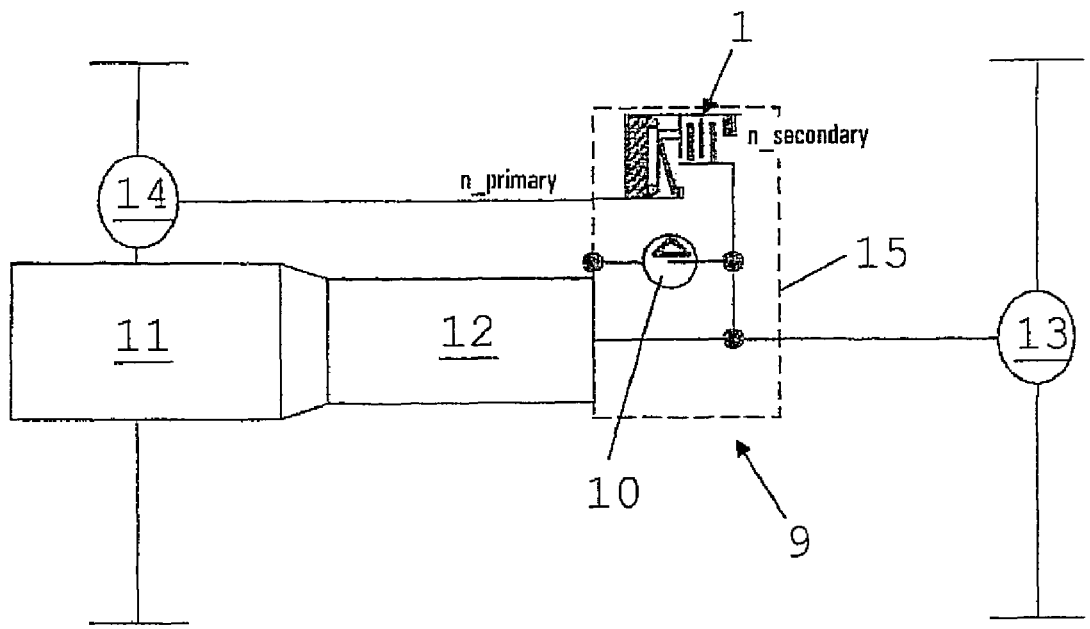
FIG. 3 is a schematic illustration of a principle as in FIG. 2, but relating to another design embodiment.

According to the example embodiment shown in FIG. 3, the mechanically driven oil pump 10 with its delivery means is in active connection with the secondary portion of the clutch 1 and, with its pump housing, is supported on the housing of the transfer gearbox 9, which can also be made as an automatic transmission known as such.

Particularly in the case of conventional automatic transmissions, it has been found expedient to design the oil circuit for cooling the clutch 1 so that it can be blocked so that the flow of cooling oil is switched on only when the clutch is actively actuated or when the clutch 1 has to be operated in an at least partially disengaged condition with a speed difference, but is otherwise interrupted.

Accordingly, to switch on or interrupt the flow of cooling oil at least one hydraulically actuated switching valve or an electrically operated actuator, such as a magnetic valve (not shown), is associated with the suction side or the pressure side of the mechanically driven oil pump 10. The at least one hydraulically actuated switching valve can advantageously be actuated, as necessary, by the control pressure for the electrically driven oil pump 2 determined by the electronic pump control unit 6 (FIG. 1).

On the other hand, if an electrically operated actuator is used, this can be activated or de-activated, as necessary, directly by the electronic pump control unit 6 or any other suitable control unit incorporated in the drive train of the motor vehicle.

Furthermore, it has been found expedient for the wet-operated clutch 1 to comprise a buffer reservoir for temporarily holding surplus cooling oil, i.e., cooling oil produced as a result of increased delivery power of the mechanically driven, second oil pump 10 caused by any speed surges. Such speed surges or even speed difference peaks under load can give rise to a certain brief delivery power boost of the oil pump 10 and thus to a higher cooling oil volume flow which, however, cannot pass through the clutch 1 in a short time. When any such speed surge and consequent volume flow maximum have abated, the stored oil surplus can be used for after-cooling the clutch.

Such a buffer reservoir can be made as an oil reservoir which is arranged directly on or in the clutch and is filled or charged if peaks in volume flow occur.

As can also been seen from FIGS. 1 to 3 in the present case, the cooling oil supply to the wet-operating clutch 1 takes place radially from the inside, i.e., from the center of rotation radially outward. Of course, the invention is not limited to this design form rather the cooling oil supply can also take place radially from the outside inward.

REFERENCE NUMERALS 1 clutch
2 oil pump (electrically driven)
2a electric motor (of oil pump 2)
3 oil sump
4 suction filter
5 pressure duct
6 pump control unit
7 control current
8 on-board electrical system
9 transfer gearbox
10 oil pump (mechanically driven)
11 drive engine
12 transmission
13 rear axle
14 front axle
15 non-rotating component, housing
p_kpl clutch actuation

The invention claimed is:

1. A hydraulic system for a motor vehicle with at least one hydraulically actuated clutch such that to actuate the at least one hydraulically actuated clutch (1), an oil pressure being delivered by a first oil pump such that pressure control of the at least one clutch (1) being effected directly and exclusively by the first oil pump (2) which is electrically driven and electronically controlled,
   a cooling oil volume flow to the at least one clutch (1) being provided by a mechanically driven, second oil pump (10) associated therewith, and
   cooling being initiated by at least one hydraulically actuated switching valve associated with one of a suction and a pressure side of the second oil pump (10), which is actuated as necessary by the control pressure of the first oil pump (2), as determined by an electronic pump control unit (6).

2. The hydraulic system according to claim 1, wherein the first oil pump (2) is associated with at least one oil pressure sensor that sends measurement values to the electronic pump control unit (6) for regulating the oil pressure, and the electronic pump control unit (6) generates control signals for controlling an electric motor (2a) of the first oil pump (2) as a function of at least one of a predetermined clutch pressure specification and a clutch torque specification.

3. The hydraulic system according to claim 2, wherein the pump control unit (6) is either a separate control unit or is implemented in one of a transmission control device and an engine control device.

4. The hydraulic system according to claim 1, wherein to regulate the oil pressure, the first oil pump (2) is associated with one of a pump flow determination sensor, a pump torque sensor and a pump speed sensor, and measurement values obtained thereby are sent to the electronic pump control unit (6), which generates control signals for controlling the electric motor (2a) of the first oil pump (2) as a function of at least one of a predetermined clutch pressure specification and clutch torque specification.

5. The hydraulic system according to claim 4, wherein at least one of a measured current temperature and a viscosity of the hydraulic oil is considered when the electronic pump control unit (6) determines the control signals for controlling the electric motor (2a) of the first oil pump (2).

6. The hydraulic system according to claim 1, wherein the first oil pump (2) is associated with a bypass in a hydraulic circuit with one of a bypass valve and a bypass throttle to ensure long-term operation of the first oil pump (2) and a dynamical response to varying pressure conditions.

7. The hydraulic system according to claim 6, wherein the bypass is designed so that an internal leakage, produced by the first oil pump (2), is directed to at least one of a suction side thereof and the clutch (1) as a basic supply for cooling.

8. The hydraulic system according to claim 1, wherein the second oil pump (10) is in active connection with the clutch (1) so that the second oil pump (10) is driven as result of a speed difference between a primary side and a secondary side of the clutch (1).

9. The hydraulic system according to claim 1, wherein the second oil pump (10) is actively connected to the clutch (1) by upstream drive gearing in such manner that a minimum pump speed is maintained so that a delivery of oil is maintained.

10. The hydraulic system according to claim 1, wherein the cooling is initiated by operating the at least one hydraulically actuated switching valve and is otherwise interrupted when both the clutch (1) is actively actuated and when the clutch (1) is operated in an at least partially disengaged condition with a speed difference between a primary side and a secondary side of the clutch (1).

11. The hydraulic system according to claim 1, wherein the clutch (1) is associated with a buffer reservoir which temporarily stores surplus cooling oil produced by elevated delivery quantities resulting from brief speed surges of the second oil pump (10).

12. The hydraulic system according to claim 11, wherein the surplus oil is used for after-cooling the clutch (1) once the speed surge and a volume flow maximum is abated.

13. The hydraulic system according to claim 1, wherein the cooling oil supply to the clutch (1) one of flows radially inwardly and radially outwardly.

14. A hydraulic system in motor vehicles with at least one hydraulically actuated clutch (1), such that to actuate the at least one clutch (1) an oil pressure being delivered by a first oil pump such that pressure control of the at least one clutch (1) is effected directly and exclusively by the first oil pump (2) which is electrically driven and electronically controlled,
   any cooling oil volume flow to the at least one clutch (1) being provided by a mechanically driven, second oil pump (10) associated therewith, and
   cooling being initiated by at least one electrically activated actuator associated with one of a suction and a pressure side of the second oil pump (10), which is one activated and deactivated as necessary by one of an electronic pump control unit (6) and another control unit.

15. The hydraulic system according to claim 14, wherein the second oil pump (10) is driven by rotation of one component and is non-rotatably supported by an other component (15).

16. The hydraulic system according to claim 15, wherein the one component is any rotating drive train component of the motor vehicle, and the non-rotating other component (15) is a transmission housing.

17. The hydraulic system according to claim 16, wherein the actuator includes a magnetic valve.

18. A hydraulic system for controllably actuating a wet-operating hydraulic clutch (1) of a motor vehicle, the hydraulic system comprising:
   a first oil pump (2) actuates the hydraulic clutch (1) by directing a pressurized oil flow thereto, the first oil pump (2) is electrically driven and the pressurized oil flow is controllably directed at least to the hydraulic clutch (1) depending on the electrical drive of the first pump (2);

a second oil pump (10) is mechanically driven and provides a cooling oil flow to the hydraulic clutch (1) to cool the hydraulic clutch (1);

one of a hydraulically actuated switching valve and an electrically activated switching valve communicates with one of an input and an output of the second oil pump (10) and controls the cooling oil flow to the hydraulic clutch (1); and an electronic pump control unit (6) receives signals transmitted by at least one sensor and controls actuation of the one of the hydraulically actuated switching valve and the electrically activated switching valve depending on the signals received.

19. The hydraulic system according to claim 18, wherein the electronic pump control unit (6) controls the electrically driven first oil pump (2), which actuates the hydraulically actuated switching valve by directing the pressurized oil flow thereto.

20. The hydraulic system according to claim 18, wherein the electronic pump control unit (6) directly controls activation of the electrically activated switching valve.

* * * * *